United States Patent [19]

Tsumiyama et al.

[11] Patent Number: 5,786,423
[45] Date of Patent: Jul. 28, 1998

US005786423A

[54] POLYAMIDE RESIN COMPOSITION

[75] Inventors: Tatsuo Tsumiyama; Satoru Nakamoto, both of Yamaguchi, Japan

[73] Assignee: UBE Industries, Ltd., Yamaguchi, Japan

[21] Appl. No.: 947,285

[22] Filed: Oct. 7, 1997

Related U.S. Application Data

[63] Continuation of Ser. No. 635,132, Apr. 19, 1996, abandoned.

[30] Foreign Application Priority Data

Apr. 21, 1995 [JP] Japan .................. 7-096668

[51] Int. Cl.$^6$ .................................................. C08L 77/00
[52] U.S. Cl. ..................................................... 525/66
[58] Field of Search ................................................ 525/66

[56] References Cited

U.S. PATENT DOCUMENTS

| | | | |
|---|---|---|---|
| 4,076,664 | 2/1978 | Pagilagan | 260/18 N |
| 4,218,509 | 8/1980 | Edgar et al. | 528/339 |
| 5,071,924 | 12/1991 | Koch et al. | 525/432 |
| 5,182,336 | 1/1993 | Abe et al. | 525/132 |
| 5,256,718 | 10/1993 | Yamamoto et al. | 524/411 |
| 5,482,998 | 1/1996 | Muehlbach et al. | 525/66 |

FOREIGN PATENT DOCUMENTS

| | | |
|---|---|---|
| 0 234 819 A3 | 9/1987 | European Pat. Off. . |
| 0 382 048 A2 | 8/1990 | European Pat. Off. . |
| 0 509 282 A3 | 10/1992 | European Pat. Off. . |
| 0 519 248 A1 | 12/1992 | European Pat. Off. . |
| 0 550 308 A1 | 7/1993 | European Pat. Off. . |
| 0 583 782 A1 | 2/1994 | European Pat. Off. . |
| 2 324 159 | 11/1974 | Germany . |
| 52-62399 | 5/1977 | Japan . |
| 58-120665 | 7/1983 | Japan . |
| 62-14180 | 4/1987 | Japan . |
| 64-011072 | 2/1989 | Japan . |
| 01-098665 | 4/1989 | Japan . |
| 2-240162 | 9/1990 | Japan . |
| 3-28591 | 2/1991 | Japan . |
| 03-069359 | 3/1991 | Japan . |
| 03-285951 | 12/1991 | Japan . |
| 4-198264 | 7/1992 | Japan . |
| 05-032888 | 2/1993 | Japan . |
| 05-043768 | 2/1993 | Japan . |
| 05-117525 | 5/1993 | Japan . |

*Primary Examiner*—Ana Woodward
*Attorney, Agent, or Firm*—Panitch Schwarze Jacobs & Nadel, P.C.

[57] ABSTRACT

A polyamide resin composition comprising: (A) from 50 to 92 parts by weight of a crystalline terpolymer polyamide produced from: (a) an equimolar salt of hexamethylenediamine with adipic acid, (b) an equimolar salt of hexamethylenediamine with terephthalic acid, and (c) 12-aminododecanoic acid or ω-laurolactam; (B) from 5 to 35 parts by weight of a modified polyolefin grafted with an α,β-unsaturated carboxylic acid or an anhydride or derivative thereof; and (C) from 3 to 15 parts by weight of polyamide 12, with the total amount of the composition being 100 parts by weight.

10 Claims, No Drawings

POLYAMIDE RESIN COMPOSITION

This application is a continuation of Ser. No. 08/635,132 filed Apr. 19, 1996, now abandoned.

FIELD OF THE INVENTION

The present invention relates to a polyamide resin composition. More particularly, the present invention relates to a polyamide resin composition excellent in dimensional stability, heat resistance, mechanical strength, moldability, and suitability for short-cycle molding.

BACKGROUND OF THE INVENTION

Polyamide resins are generally superior in heat resistance, oil resistance, moldability, rigidity, toughness, etc. The applications of polyamide resins have hence spread to various functional parts such as power tools, general-purpose industrial parts, machine parts, electrical parts, electronic parts, interior and exterior automotive parts, automotive parts for use in engine compartments, and parts for automotive electrical equipment.

However, aliphatic polyamides have a problem that since the water absorption thereof is high, moldings of such aliphatic polyamides undergo considerable fluctuations in dimension and physical properties upon water absorption.

To mitigate the above-described problem, semiaromatic polyamides have been proposed which are polyamides produced by polycondensation of an aromatic polyamide and an aliphatic polyamide.

Since semiaromatic polyamides have low water absorption unlike aliphatic polyamides, use of the semiaromatic polyamides is effective to eliminate the above-described problem that moldings undergo fluctuations in dimension, physical properties, etc. upon water absorption. Another advantage of the semiaromatic polyamides is that since they generally have a higher melting point than aliphatic polyamides, they are superior in heat resistance.

However, a closer investigation on molded articles obtained from semiaromatic polyamides has revealed that these molded articles are inferior in elongation and toughness such as impact resistance to molded articles obtained from aliphatic polyamides.

Under these circumstances, various improvements on semiaromatic polyamides also have been attempted. For example, incorporation of a modified polyolefin into a copolymer of an aliphatic polyamide having a crystallinity of 35% or higher and a glass transition point of 90° C. or higher with terephthalic acid and an aliphatic diamine is described in JP-A-3-28591 (the term "JP-A" as used herein means an "unexamined published Japanese patent application); incorporation of a modified polyolefin and a stabilizer into a copolymer of terephthalic acid units/aliphatic dicarboxylic acid units and an aliphatic diamine is described in JP-A-4-198264; incorporation of an aliphatic polyamide into a copolymer of hexamethylenediamine adipate and hexamethylene-diamine terephthalate is described in JP-A-58-120665; and incorporation of caprolactam into a copolymer of hexamethylenediamine adipate and hexamethylenediamine terephthalate is described in JP-A-2-240162. Furthermore, a terpolymer produced from hexamethylenediamine adipate, hexamethylenediamine terephthalate, and other aliphatic diamine/aliphatic dicarboxylic acid is described in JP-A-52-62399.

However, the proposed semiaromatic polyamides described above each is basically a copolymer or is a terpolymer which partly differs from the terpolymer polyamide used in the present invention.

Although the proposed semiaromatic polyamides described above have high heat resistance and some degree of toughness, those semiaromatic polyamides, when used in the aforementioned applications, are insufficient in rigidity and required to have further improved toughness, etc. Thus, the proposed semiaromatic polyamides are not always satisfactory.

SUMMARY OF THE INVENTION

An object of the present invention is to provide a polyamide resin composition excellent in dimensional stability, heat resistance, mechanical strength, moldability, and suitability for short-cycle molding.

Other objects and effects of the present invention will be apparent from the following description.

The present inventors made intensive studies in order to provide a polyamide resin composition which retains the heat resistance and low water absorption of semiaromatic polyamides, is excellent in toughness unlike the conventional semiaromatic polyamides, and shows excellent flowability during injection molding. As a result, the present invention has been achieved.

The present invention relates to a polyamide resin composition comprising:

(A) from 50 to 92 parts by weight of a crystalline terpolymer polyamide produced from:
  (a) an equimolar salt of hexamethylenediamine with adipic acid,
  (b) an equimolar salt of hexamethylenediamine with terephthalic acid, and
  (c) 12-aminododecanoic acid or ω-laurolactam;

(B) from 5 to 35 parts by weight of a modified polyolefin grafted with an $\alpha,\beta$-unsaturated carboxylic acid or an anhydride or derivative thereof; and (C) from 3 to 15 parts by weight of polyamide 12, with the total amount of the composition being 100 parts by weight.

DETAILED DESCRIPTION OF THE INVENTION

The crystalline terpolymer polyamide (A) for use in the present invention is a polyamide produced from:

(a) an equimolar salt of hexamethylenediamine with adipic acid, (b) an equimolar salt of hexamethylenediamine with terephthalic acid, and (c) 12-aminododecanoic acid or ω-laurolactam.

The equimolar salt (a) of hexamethylenediamine with adipic acid means a salt synthesized so that an aqueous solution of both at 80° C. has a pH of 7.1. It should be noted that when this equimolar salt is used in polymerization, part of the hexamethylenediamine flows out along with the water removed from the polymerization system. It is therefore preferred to use a salt in which the molar proportions of hexamethylenediamine and adipic acid differ slightly, e.g., the proportion of hexamethylenediamine is larger by about 1% by mole based on the amount of the salt used for polymerization.

The equimolar salt (b) of hexamethylenediamine with terephthalic acid means a salt synthesized so that an aqueous solution of both at 80° C. has a pH of 6.9. It is however preferred to use a salt in which the molar proportions of hexamethylenediamine and terephthalic acid differ slightly for the reason described above for the equimolar salt (a).

The ω-laurolactam (c) is not particularly limited as to whether this compound is used as it is or after being converted to 12-aminododecanoic acid through ring opening.

The proportions of ingredients (a), (b), and (c) used for producing the crystalline terpolymer polyamide for use in the present invention are preferably from 20 to 80% by weight, from 20 to 80% by weight, and from 1 to 30% by weight, respectively, with the total amount of the terpolymer polyamide being 100% by weight. The proportions of ingredients (a), (b), and (c) are particularly preferably from 25 to 75% by weight, from 25 to 75% by weight, and from 5 to 20% by weight, respectively.

If the proportion of ingredient (a) is smaller than 20% by weight and that of ingredient (b) is larger than 80% by weight, the melting point of the resulting crystalline terpolymer polyamide becomes high, and it is not preferred since the polyamide disadvantageously suffers pyrolysis during molding. If the proportion of ingredient (a) is larger than 80% by weight and that of ingredient (b) is smaller than 20% by weight, it is not preferred since the resulting polyamide disadvantageously gives moldings having increased water absorption. Proportions of ingredient (c) smaller than 1% by weight are not preferred since the effect of improving tensile elongation tends to be failed and the resulting crystalline terpolymer polyamide tends to have impaired physical properties. Proportions of ingredient (c) larger than 30% by weight are not preferred since not only crystallinity decreases considerably to result in a prolonged cycle time in injection molding, but also the resulting polyamide tends to have a lowered melting point and hence impaired heat resistance.

For producing the crystalline terpolymer polyamide for use in the present invention, the sequence of polymerization reactions is not particularly limited and any desired method may be employed. Examples thereof include a method in which ingredients (a), (b), and (c) are copolymerized simultaneously; a method in which ingredients (a) and (b) are copolymerized first and ingredient (c) is then copolymerized; a method in which ingredients (a) and (c) are copolymerized first and ingredient (b) is then copolymerized; and a method in which ingredients (b) and (c) are copolymerized first and ingredient (a) is then copolymerized.

For example, a method can be employed, which comprises introducing ingredients (a), (b), and (c) into a pressure polymerizing vessel equipped with a stirrer, heating the contents to a given temperature to obtain a precopolymer having a molecular weight of from 1,500 to 3,000, and then conducting post-polymerization using an extruder at a temperature slightly higher than the melting point of the precopolymer to produce a crystalline terpolymer.

The crystalline terpolymer polyamide obtained for the present invention can be ascertained to be a terpolymer of the above-described ingredients (a), (b), and (c) by means of the following analyses. That is, the crystalline terpolymer polyamide has one distinct melting point, which shifts to some degree depending on comonomer proportions. Further, absorption peaks characteristic of the polyamide were observed by $C^{13}$ nuclear magnetic resonance spectrometry, $C^{13}$-NMR.

The modified polyolefin (B) for use in the present invention is produced by grafting an α,β-unsaturated carboxylic acid or an anhydride or derivative thereof onto a polymer of an α-olefin preferably having 2 or more carbon atoms, especially from 2 to 18 carbon atoms. Examples of the α-olefin include ethylene, propylene, 1-butene, 1-hexene, 1-decene, and 1-pentene. These α-olefins may be used alone or in combination of two or more thereof. Ethylene is especially preferably used.

Examples of the α,β-unsaturated carboxylic acid or anhydride or derivative thereof used for the graft modification of a polymer of these α-olefins include monobasic carboxylic acids such as acrylic acid, methacrylic acid, crotonic acid, and isophthalic acid, dibasic carboxylic acids such as maleic acid, fumaric acid, itaconic acid, and citraconic acid, and anhydrides or salts of these acids. Preferred are acrylic acid, methacrylic acid, maleic anhydride, itaconic anhydride, and the zinc salts and sodium salts thereof. Especially preferably used are maleic anhydride and itaconic anhydride.

The proportion of the α,β-unsaturated carboxylic acid or anhydride or derivative thereof grafted for modification is preferably from 0.5 to 5% by mole, especially preferably from 1 to 3% by mole, based on the amount of repeating units of the α-olefin. Grafted compound amounts smaller than the lower limit are not preferred since adhesion between the polyamide phase and the polyolefin phase is insufficient, so that the resin composition obtained tends to have an unstable structure and reduced mechanical strength. Grafted compound amounts exceeding the upper limit are not preferred since the resin composition obtained tends to have poor flowability, which is an obstacle to molding.

The polyamide 12 (C) for use in the present invention is a polymer obtained by polymerizing ω-laurolactam or 12-aminododecanoic acid. This polymer preferably has a number-average molecular weight of from 8,000 to 40,000, more preferably from 9,000 to 25,000.

Number-average molecular weights of the polyamide 12 lower than 8,000 are not preferred since physical properties, especially toughness, of the resin composition tends to be impaired. Number-average molecular weights thereof higher than 40,000 are not preferred since flowability during injection molding tends to be reduced. The polyamide 12 may contain additives for improving heat resistance and weatherability.

The incorporation of the polyamide 12 (C) is effective in imparting a well balanced combination of water absorption and rigidity to the polyamide resin composition of the present invention. That is, polyamide resin compositions to which the polyamide 12 has not been added should contain a larger proportion of the modified polyolefin so as to attain reduced water absorption. However, the incorporation of the modified polyolefin in a larger proportion results in reduced rigidity. Thus, the polyamide 12 is incorporated in order to obtain a polyamide resin composition combining low water absorption and high rigidity.

The polyamide resin composition (100 parts by weight in total) of the present invention is obtained by compounding the crystalline terpolymer polyamide (A) with the modified polyolefin (B) and polyamide 12 (C) in the following proportions. The amounts of components (A), (B), and (C) in the polyamide resin composition of the present invention are from 50 to 92 parts by weight, from 5 to 35 parts by weight, and from 3 to 15 parts by weight, respectively, per 100 parts by weight of the composition. The amounts of components (A), (B), and (C) are preferably from 65 to 85 parts by weight, from 10 to 25 parts by weight, and from 5 to 10 parts by weight, respectively, per 100 parts by weight of the composition.

Component (A) amounts smaller than 50 parts by weight per 100 parts by weight of the total amount of the polyamide resin composition are undesirable in that the heat resistance and mechanical properties of the polyamide resin composition are impaired, while amounts thereof larger than 92 parts by weight are undesirable because toughness is reduced. Component (B) amounts smaller than 5 parts by weight per 100 parts by weight of the composition are undesirable because toughness is reduced, while amounts thereof larger than 35 parts by weight are undesirable in that mechanical properties and heat resistance are impaired. Component (C) amounts smaller than 3 parts by weight per 100 parts by weight of the composition are undesirable because this results in moldings which undergo an enhanced dimensional change, while amounts thereof larger than 15 parts by weight are undesirable in that heat resistance is reduced.

For compounding the crystalline terpolymer polyamide (A) with the modified polyolefin (B) and the polyamide 12 (C) to obtain the polyamide resin composition of the present invention, a known method may be used, such as, e.g., melt-kneading with a single-, twin-, or multi-screw extruder.

The polyamide resin composition of the present invention is moldable by various molding techniques such as, e.g., injection molding, extrusion molding, blow molding, vacuum forming, and press molding.

Molded articles of any desired shape can be obtained with these molding techniques. For example, the molded articles are suitable for use not only as interior and exterior automotive parts, automotive parts for use in engine compartments, and parts for automotive electrical equipment, but also as electrical or electronic parts, in power tools, or as mechanical parts such as gears and cams.

The present invention will be explained in more detail by reference to the following Examples and Comparative Examples, but the present invention is not construed as being limited thereto.

Test pieces used were examined for physical properties by the following methods.

(1) Relative viscosity: JIS K6810

(2) Tensile test: ASTM D638

(3) Bending test: ASTM D790

(4) Water absorption: ASTM D570

(5) Impact test: ASTM D256

(6) Heat distortion temperature: ASTM D256 (load, 4.6 kg)

(7) Crystallinity: Crystallinity was evaluated based on as to whether the sample showed a distinct endothermic peak due to melting (melting point) and a distinct exothermic peak due to crystallization (crystallization point) when heated and cooled at a rate of 10° C./min in a DSC manufactured by Seiko Denshi Kogyo K.K.

(8) $C^{13}$-NMR: Measurement was made on a 20 wt % sample solution in 97% heavy sulfuric acid as solvent at a frequency of 100.536 MHz using NMR apparatus JNM-EX400WB, manufactured by JEOL Ltd. As a result, the polyamide was ascertained to be a terpolymer polyamide having characteristic absorption peaks at 172.5 ppm, 178.7 ppm, and 180.3 ppm. The carbon atoms exhibiting the characteristic absorption peaks are shown below.

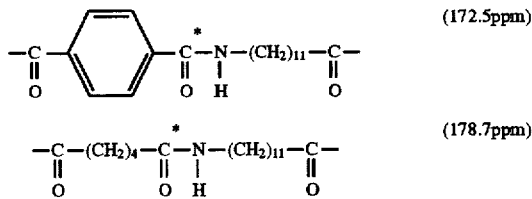

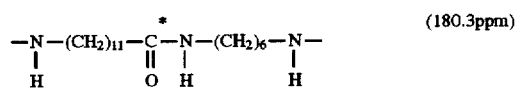

EXAMPLE 1

A mixture of 48.5% by weight of an equimolar hexamethylenediamine/adipic acid salt, 48.5% by weight of an equimolar hexamethylenediamine/terephthalic acid salt, and 3% by weight of 12-aminododecanoic acid was introduced into a pressure polymerizing vessel equipped with a stirrer. The mixture was pre-polymerized under high-temperature high-pressure conditions of 250° C. and 22 kg/cm²G. The prepolymer obtained had a relative viscosity of 1.25. The prepolymer was post-polymerized at 320° C. in a twin-screw extruder having an L/D ratio of 42 (UME55, manufactured by Ube Industries, Ltd.) to obtain a polymer in the form of strands, which was then pelleted with a pelletizer. The terpolymer obtained had a relative viscosity of 2.52, a melting point of 290° C., and a crystallization point of 254° C. A $C^{13}$-NMR spectrum thereof had absorption peaks at 172.5 ppm, 178.7 ppm, and 180.3 ppm characteristic of the objective terpolymer polyamide.

A mixture of 75 parts by weight of the crystalline terpolymer polyamide, 15 parts by weight of a modified polyethylene obtained by graft-modifying polyethylene with 1% by mole of maleic anhydride, and 10 parts by weight of polyamide 12 (number-average molecular weight: 14,000, hereinafter the same) was melt-kneaded at 315° C. using a twin-screw extruder (TEX44, manufactured by The Japan Steel Works, Ltd.), pelleted, and then dried to obtain a polyamide resin composition. The evaluation results obtained are shown in Table 1.

EXAMPLE 2

A crystalline terpolymer polyamide was obtained under the same conditions as in Example 1, except that a mixture of 45% by weight of an equimolar hexamethylenediamine/adipic acid salt, 45% by weight of an equimolar hexamethylene-diamine/terephthalic acid salt, and 10% by weight of 12-aminododecanoic acid was introduced into the polymerizing vessel. The prepolymer had a relative viscosity of 1.23, while the crystalline terpolymer polyamide obtained by post-polymerization had a relative viscosity of 2.49, a melting point of 283° C., and a crystallization point of 234° C.

A mixture of 75 parts by weight of the crystalline terpolymer polyamide, 15 parts by weight of a modified polyethylene prepared in the same manner as in Example 1, and 10 parts by weight of polyamide 12 was treated in the same manner as in Example 1 to obtain a polyamide resin composition. The evaluation results obtained are shown in Table 1.

EXAMPLE 3

A crystalline terpolymer polyamide was obtained under the same conditions as in Example 1, except that a mixture of 57% by weight of an equimolar hexamethylenediamine/adipic acid salt, 38% by weight of an equimolar hexamethylene-diamine/terephthalic acid salt, and 5% by weight of 12-aminododecanoic acid was introduced into the polymerizing vessel. The prepolymer had a relative viscosity of 1.23, while the crystalline terpolymer polyamide obtained by post-polymerization had a relative viscosity of 2.55, a melting point of 275° C., and a crystallization point of 244° C.

A mixture of 75 parts by weight of the crystalline terpolymer polyamide, 15 parts by weight of a modified polyethylene prepared in the same manner as in Example 1, and 10 parts by weight of polyamide 12 was treated in the same manner as in Example 1 to obtain a polyamide resin composition. The evaluation results obtained are shown in Table 1.

EXAMPLES 4 TO 6

A crystalline terpolymer polyamide was obtained from an equimolar hexamethylenediamine/adipic acid salt, an equimolar hexamethylenediamine/terephthalic acid salt, and 12-aminododecanoic acid in the same manner as in Example 1. The polyamide was compounded with the modified polyethylene and the polyamide 12, both of which were the same as those used in Example 1, in given proportions in the same manner as in Example 1 to obtain resin compositions. The evaluation results obtained are shown in Table 1.

TABLE 1

|  | Examples | | | | | |
|---|---|---|---|---|---|---|
|  | 1 | 2 | 3 | 4 | 5 | 6 |
| Terpolymer polyamide | | | | | | |
| 66 Salt* (wt %) | 48.5 | 45 | 57 | 48.5 | 48.5 | 48.5 |
| 6T Salt** (wt %) | 48.5 | 45 | 38 | 48.5 | 48.5 | 48.5 |
| ADA*** (wt %) | 3 | 10 | 5 | 3 | 3 | 3 |
| Found values | | | | | | |
| Relative viscosity | 2.52 | 2.49 | 2.55 | 2.52 | 2.52 | 2.52 |
| Melting point (°C.) | 290 | 283 | 275 | 290 | 290 | 290 |
| Solidifying point (°C.) | 254 | 234 | 244 | 254 | 254 | 254 |
| Composition (part by weight) | | | | | | |
| Terpolymer polyamide | 75 | 75 | 75 | 75 | 70 | 85 |
| Modified polyethylene | 15 | 15 | 15 | 10 | 25 | 10 |
| Polyamide 12 | 10 | 10 | 10 | 15 | 5 | 5 |
| Evaluation results | | | | | | |
| Tensile strength (MPa) | 55 | 48 | 52 | 58 | 52 | 60 |
| Tensile elongation (%) | 150 | 200 | 200 | 180 | 200 | 150 |
| Flexural strength (MPa) | 75 | 70 | 73 | 78 | 70 | 82 |
| Flexural modulus (GPa) | 1.91 | 1.81 | 1.88 | 2.00 | 1.80 | 2.20 |
| Impact strength (J/m) | 140 | 140 | 140 | 130 | 210 | 130 |
| Water absorption (%) | 0.50 | 0.40 | 0.48 | 0.50 | 0.43 | 0.53 |
| Heat distortion temperature (°C.) | 185 | 175 | 180 | 185 | 165 | 190 |

Note:
*66 Salt: Equimolar salt of hexamethylenediamine with adipic acid
**6T Salt: Equimolar salt of hexamethylenediamine with terephthalic acid
***ADA: 12-Aminododecanoic acid

COMPARATIVE EXAMPLES 1 TO 3

A mixture of 50% by weight of an equimolar hexamethylenediamine/adipic acid salt and 50% by weight of an equimolar hexamethylenediamine/terephthalic acid salt was pre-polymerized and post-polymerized under the same conditions as in Example 1 to obtain a crystalline copolymer polyamide. The prepolymer had a relative viscosity of 1.25, while the polymer obtained by post-polymerization had a relative viscosity of 2.50, a melting point of 294° C., and a crystallization point of 255° C.

The crystalline copolymer polyamide was compounded with the modified polyethylene and the polyamide 12, both of which were the same as those used in Example 1, in given proportions in the same manner as in Example 1 to obtain resin compositions. The evaluation results obtained are shown in Table 2.

COMPARATIVE EXAMPLE 4

A mixture of 60% by weight of an equimolar hexamethylenediamine/adipic acid salt and 40% by weight of an equimolar hexamethylenediamine/terephthalic acid salt was pre-polymerized and post-polymerized under the same conditions as in Example 1 to obtain a crystalline copolymer polyamide. The prepolymer had a relative viscosity of 1.24, while the polymer obtained by post-polymerization had a relative viscosity of 2.51, a melting point of 284° C., and a crystallization point of 250° C.

The crystalline copolymer polyamide was compounded with the modified polyethylene and the polyamide 12, both of which were the same as those used in Example 1, in a given proportion in the same manner as in Example 1 to obtain a resin composition. The evaluation results obtained are shown in Table 2.

COMPARATIVE EXAMPLES 5 AND 6

The crystalline terpolymer polyamide obtained in Example 1 was compounded with a modified polyethylene and polyamide 12 to obtain resin compositions. The evaluation results obtained are shown in Table 2.

TABLE 2

|  | Comparative Examples | | | | | |
|---|---|---|---|---|---|---|
|  | 1 | 2 | 3 | 4 | 5 | 6 |
| Terpolymer polyamide | | | | | | |
| 66 Salt* (wt %) | 50 | 50 | 50 | 60 | 48.5 | 48.5 |
| 6T Salt** (wt %) | 50 | 50 | 50 | 40 | 48.5 | 48.5 |
| ADA*** (wt %) | 0 | 0 | 0 | 0 | 3 | 3 |
| Found values | | | | | | |
| Relative viscosity | 2.50 | 2.50 | 2.50 | 2.51 | 2.52 | 2.52 |
| Melting point (°C.) | 294 | 294 | 294 | 284 | 290 | 290 |
| Solidifying point (°C.) | 255 | 255 | 255 | 250 | 254 | 254 |
| Composition (part by weight) | | | | | | |
| Terpolymer polyamide | 75 | 60 | 85 | 75 | 40 | 95 |
| Modified polyethylene | 15 | 20 | 10 | 15 | 40 | 3 |
| Polyamide 12 | 10 | 20 | 5 | 10 | 20 | 2 |
| Evaluation results | | | | | | |
| Tensile strength (MPa) | 55 | 48 | 58 | 53 | 41 | 75 |
| Tensile elongation (%) | 80 | 140 | 50 | 90 | 200 | 20 |
| Flexural strength (MPa) | 75 | 68 | 80 | 73 | 55 | 93 |
| Flexural modulus (GPa) | 1.90 | 1.72 | 2.35 | 1.85 | 1.48 | 2.35 |
| Impact strength (J/m) | 70 | 130 | 55 | 70 | 95 | 45 |
| Water absorption (%) | 0.60 | 0.45 | 0.70 | 0.75 | 0.35 | 1.2 |
| Heat distortion temperature (°C.) | 187 | 151 | 193 | 182 | 138 | 220 |

Note:
*66 Salt: Equimolar salt of hexamethylenediamine with adipic acid
**6T Salt: Equimolar salt of hexamethylenediamine with terephthalic acid
***ADA: 12-Aminododecanoic acid The resin compositions containing the crystalline terpolymer polyamide characteristic of the present invention have a higher tensile elongation, a higher impact strength, and a lower water absorption than resin compositions containing the crystalline copolymer polyamide. Hence, the compositions according to the present invention also have the effect of reducing the dimensional change of moldings (see Examples 1 to 6 and Comparative Examples 1 to 4).

On the other hand, the resin compositions which contain the crystalline terpolymer polyamide but do not satisfy the requirement concerning component proportion have a lowered heat distortion temperature (see Comparative Example 5) or have an increased water absorption to give moldings which suffer an increased dimensional change upon water absorption (see Comparative Example 6).

By incorporating the crystalline terpolymer polyamide characteristic of the present invention in a given proportion, the polyamide resin composition of the present invention satisfactory in tensile strength, tensile elongation, flexural strength, and flexural modulus and having a high heat distortion temperature and a low water absorption is obtained. The polyamide resin composition is extensively utilizable in the automotive field and electrical/electronic field.

While the invention has been described in detail and with reference to specific examples thereof, it will be apparent to one skilled in the art that various changes and modifications can be made therein without departing from the spirit and scope thereof.

What is claimed is:

1. A polyamide resin composition comprising:
   (A) from 50 to 92 parts by weight of a crystalline terpolymer polyamide produced from:
      (a) an equimolar salt of hexamethylenediamine with adipic acid,
      (b) an equimolar salt of hexamethylenediamine with terephthalic acid, and
      (c) 12-aminododecanoic acid or ω-laurolactam;
   (B) from 5 to 35 parts by weight of a modified polyolefin grafted with an α,β-unsaturated carboxylic acid or a derivative thereof or with an anhydride or a derivative thereof; and
   (C) from 3 to 15 parts by weight of polyamide 12, with the total amount of said composition being 100 parts by weight.

2. A polyamide resin composition as claimed in claim 1, wherein said crystalline terpolymer polyamide is produced from:
   (a) from 20 to 80% by weight of an equimolar salt of hexamethylenediamine with adipic acid,
   (b) from 20 to 80% by weight of an equimolar salt of hexamethylenediamine with terephthalic acid, and
   (c) from 1 to 30% by weight of 12-aminododecanoic acid or ω-laurolactam,
   with the total amount of said terpolymer polyamide being 100% by weight.

3. A polyamide resin composition as claimed in claim 2, wherein said crystalline terpolymer polyamide is produced from:
   (a) from 25 to 75% by weight of an equimolar salt of hexamethylenediamine with adipic acid,
   (b) from 25 to 75% by weight of an equimolar salt of hexamethylenediamine with terephthalic acid, and
   (c) from 5 to 20% by weight of 12-aminododecanoic acid or ω-laurolactam,
   with the total amount of said terpolymer polyamide being 100% by weight.

4. A polyamide resin composition as claimed in claim 1, wherein said modified polyolefin is a modified polyethylene obtained by modifying polyethylene with an α,β-unsaturated carboxylic acid in an amount of from 0.5 to 5% by mole based on the amount of repeating units of said polyethylene.

5. A polyamide resin composition as claimed in claim 4, wherein said modified polyolefin is a modified polyethylene obtained by modifying polyethylene with an α,β-unsaturated carboxylic acid in an amount of from 1 to 3% by mole based on the amount of repeating units of said polyethylene.

6. A polyamide resin composition as claimed in claim 1, wherein said polyamide 12 has a number-average molecular weight of from 8,000 to 40,000.

7. A polyamide resin composition as claimed in claim 6, wherein said polyamide 12 has a number-average molecular weight of from 9,000 to 25,000.

8. A polyamide resin composition as claimed in claim 1, wherein said modified polyolefin is a modified polyethylene.

9. A polyamide resin composition as claimed in claim 1, wherein said α,β-unsaturated carboxylic acid or an anhydride or derivative thereof is maleic anhydride or itaconic anhydride.

10. A polyamide resin composition as claimed in claim 1, wherein said polyamide resin composition comprises from 65 to 85 parts by weight of said crystalline terpolymer polyamide (A), from 10 to 25 parts by weight of said modified polyolefin (B), and from 5 to 10 parts by weight of said polyamide 12 (C), with the total amount of the composition being 100 parts by weight.

* * * * *